(12) United States Patent
Zhu et al.

(10) Patent No.: US 6,723,763 B2
(45) Date of Patent: Apr. 20, 2004

(54) CURE ACCELERATORS FOR ANAEROBIC ADHESIVE COMPOSITIONS

(75) Inventors: Qinyan Zhu, Cheshire, CT (US); Shabbir Attarwala, Simsbury, CT (US)

(73) Assignee: Henkel Loctite Corporation, Rocky Hill, CT (US)

( * ) Notice: Subject to any disclaimer, the term of this patent is extended or adjusted under 35 U.S.C. 154(b) by 0 days.

(21) Appl. No.: 10/099,083

(22) Filed: Mar. 15, 2002

(65) Prior Publication Data

US 2003/0207126 A1 Nov. 6, 2003

(51) Int. Cl.$^7$ .............. C09J 4/00; C08F 220/10
(52) U.S. Cl. .............. 523/176; 156/306.9; 156/311; 525/484; 525/504; 526/217; 526/323.1; 528/99; 528/113; 528/124
(58) Field of Search .............. 526/323.1, 220, 526/217; 156/310, 306.9, 311; 523/176; 525/484, 504; 528/102, 104, 124, 99, 113

(56) References Cited

U.S. PATENT DOCUMENTS

| | | | |
|---|---|---|---|
| 3,218,305 A | 11/1965 | Krieble | 260/89.5 |
| 3,970,505 A | 7/1976 | Hauser et al. | 156/331 |
| 4,090,997 A | 5/1978 | Patel et al. | 260/47 |
| 4,166,169 A | 8/1979 | Patel et al. | 526/313 |
| 4,180,640 A | 12/1979 | Melody et al. | 526/323.1 |
| 4,287,330 A | 9/1981 | Rich | 526/270 |
| 4,321,349 A | 3/1982 | Rich | 526/270 |
| 4,447,588 A | 5/1984 | Rametta | 526/301 |
| 4,528,059 A | 7/1985 | Janssen | 156/307 |
| 5,240,469 A | * 8/1993 | Poindexter | 44/392 |
| 5,411,988 A | 5/1995 | Bockow et al. | 514/560 |
| 5,503,936 A | 4/1996 | Blyakhman | 428/413 |
| 5,578,087 A | * 11/1996 | Audousset et al. | 8/409 |
| 6,207,715 B1 | * 3/2001 | Bloom et al. | 514/580 |

FOREIGN PATENT DOCUMENTS

| | | | |
|---|---|---|---|
| DE | 1 817 989 | 8/1993 | C09J/5/00 |
| DE | 2 806 701 | 9/1993 | C08L/33/08 |
| JP | 07-308757 | 2/1996 | B22D/41/28 |
| WO | WO 00/40664 | 7/2000 | C09J/4/00 |

OTHER PUBLICATIONS

R.D. Rich, "Anaerobic Adhesives" in *Handbook of Adhesive Technology*, 29, 467–79, A. Pizzi and K.L. Mittal, eds., Marcel Dekker, Inc., New York (1994).

* cited by examiner

*Primary Examiner*—Tatyana Zalukaeva
(74) *Attorney, Agent, or Firm*—Steven C. Bauman

(57) ABSTRACT

The present invention provides a new class of materials effective as accelerators for curing anaerobic adhesives. The addition of these materials into anaerobic adhesives as a replacement for conventional curatives, such as APH and/or toluidines, surprisingly provides at higher cure speeds and comparable physical properties for the reaction products formed therefrom.

11 Claims, No Drawings

CURE ACCELERATORS FOR ANAEROBIC ADHESIVE COMPOSITIONS

BACKGROUND OF THE INVENTION

1. Field of the Invention

The present invention relates to a novel class of cure accelerators for anaerobic adhesive compositions.

2. Brief Description of Related Technology

Anaerobic adhesive compositions generally are well-known. See e.g., R. D. Rich, "Anaerobic Adhesives" in *Handbook of Adhesive Technology*, 29, 467–79, A. Pizzi and K. L. Mittal, eds., Marcel Dekker, Inc., New York (1994), and references cited therein. Their uses are legion and new applications continue to be developed.

Conventional anaerobic adhesives ordinarily include a free-radically polymerizable acrylate ester monomer, together with a peroxy initiator and an inhibitor component. Oftentimes, such anaerobic adhesive compositions also contain accelerator components to increase the speed with which the composition cures.

Desirable anaerobic cure-inducing compositions to induce and accelerate cure may include saccharin, toluidines, such as N,N-diethyl-p-toluidine and N,N-dimethyl-o-toluidine, acetyl phenylhydrazine ("APH"), maleic acid, and quinones, such as napthaquinone and anthraquinone. See e.g., Loctite U.S. Pat. Nos. 3,218,305 (Krieble), 4,180,640 (Melody), 4,287,330 (Rich) and 4,321,349 (Rich).

In addition, other curatives for anaerobic adhesives include thiocaprolactam (e.g., U.S. Pat. No. 5,411,988) and thioureas [e.g., U.S. Pat. No. 3,970,505 (Hauser) (tetra methyl thiourea), German Patent Document Nos. DE 1 817 989 (alkyl thioureas and N,N'-dicyclohexyl thiourea) and 2 806 701 (ethylene thiourea), and Japanese Patent Document No. JP 07-308,757 (acyl, alkyl, alkylidene, alkylene and alkyl thioureas)], certain of the latter of which had been used commercially up until about twenty years ago.

Recently, Loctite Corporation has discovered a new class of materials—trithiadiaza pentalenes—effective as curatives for anaerobic adhesive compositions. The addition of these materials into anaerobic adhesives as a replacement for conventional curatives (such as APH) surprisingly provides at least comparable cure speeds and physical properties for the reaction products formed therefrom. (See International Patent Publication No. WO 00/40664.)

In an unrelated field of technology, U.S. Pat. No. 5,503,936 (Blyakhman) describes and claims curable modified epoxy resin compositions having an epoxy resin, a hardener or curing agent and 2.5 to 12.5% by weight of a compound represented by

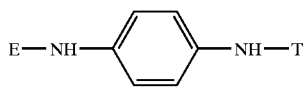

where E and T are $C_{5-12}$ alkyl, $C_{5-8}$ cycloalkyl, $C_{7-15}$ phenylalkyl, or $C_{6-10}$ aryl, with or without substitution by one or two $C_{1-4}$ groups. The hardeners or curing agents of the '936 patent are described as aliphatic, aromatic or cycloaliphatic di- or polyamines, such as diethylenetriamine, N-aminoethylpiperazine, 4,4'-diaminodicyclohexylmethane, 4,4'-diaminodiphenyl sulfone, diethyldiaminotoluene, dicyandiamide, or guanidine; polycarboxylic acid anhydrides, such as phthalic anhydride or trimellitic anhydride; catalytic curing agents such as tertiary amines, imidazoles or complexes of boron trifluoride; difunctional and multifunctional phenols; or phenol or cresol novolac resins.

In addition, a number of suppliers including Flexsys America, Akron, Ohio, Sumitomo Chemical, Osaka, Japan, and Crompton Corporation, Waterbury, Conn. sell phenylene diamine type anti-oxidants, which are promoted to retard oxidation, degradation, or pre-mature polymerization.

There is an on-going desire to find alternative technologies to differentiate existing products and provide supply assurances in the event of shortages or cessation of supply of raw materials. Accordingly, it would be desirable to identify new materials which function as accelerators in the cure of anaerobic adhesives.

SUMMARY OF THE INVENTION

The present invention provides a new class of materials—phenylene diamines—, which surprisingly are effective as cure accelerators for anaerobic adhesive compositions. Members of this class of materials are promoted to retard oxidation, degradation, or pre-mature polymerization, and nevertheless function to accelerate the cure of anaerobic adhesive compositions.

The addition of these materials into anaerobic adhesives as a replacement for some or all of the amount of conventional anaerobic cure accelerators (such as the toluidines noted above) surprisingly provides at least comparable cure speeds and physical properties for the reaction products formed therefrom.

In one aspect of the invention, this class of materials may be defined as those within the following structure I:

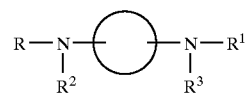

where R and $R^1$ may be the same or different and may be selected from $C_{1-12}$ alkyl, $C_{1-12}$ alkenyl, $C_{5-12}$ cyclo or bicycloalkyl, $C_{6-18}$ aryl, and derivatives thereof, $R^2$ and $R^3$ may be the same or different and may be selected from hydrogen, $C_{1-12}$ alkyl, $C_{1-12}$ alkenyl, $C_{5-12}$ cyclo or bicycloalkyl, $C_{6-18}$ aryl, and derivatives thereof and

is $C_{6-18}$ arylene, and derivatives thereof, and oxidized versions thereof.

This invention also provides anaerobic adhesives and anaerobic adhesive systems prepared with such cure accelerators, methods of preparing and using the inventive anaerobic adhesives as well as reaction products of the inventive anaerobic adhesives.

The present invention will be more fully appreciated by a reading of the "Detailed Description of the Invention", and the illustrative examples which follow thereafter.

DETAILED DESCRIPTION OF THE INVENTION

The present invention provides phenylene diamine cure accelerators, for use in the cure of anaerobic adhesives and anaerobic adhesive systems. The addition of such compounds as cure accelerators into anaerobic adhesives as a replacement for some or all of the amount of conventional cure accelerators surprisingly provides at least comparable cure speeds and physical properties for the reaction products formed.

In one aspect of the invention, the cure accelerators should have at least two amines, desirably secondary amines, available for reaction. In some instances, one or more of the amines may be primary or tertiary amines. For instance, these cure accelerators may be represented as within the following structure I:

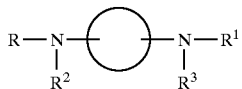

I where R and $R^1$ may be the same or different and may be selected from $C_{1-12}$ alkyl, $C_{1-12}$ alkenyl, $C_{5-12}$ cyclo or bicycloalkyl, $C_{6-18}$ aryl, and derivatives thereof, $R^2$ and $R^3$ may be the same or different and may be selected from hydrogen, $C_{1-12}$ alkyl, $C_{1-12}$ alkenyl, $C_{5-12}$ cyclo or bicycloalkyl, $C_{6-18}$ aryl, and derivatives thereof and

is $C_{6-18}$ arylene, and derivatives thereof, and oxidized versions thereof.

Within structure I are a variety of materials that may be used herein, for instance, the aromatic diamines represented by structures II:

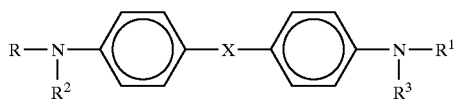

II where X is NH, O or S, R, $R^1$, $R^2$, and $R^3$ are as described above.

With that structure are those compounds within structure III:

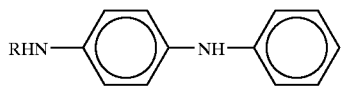

III where R is as defined above. In addition, the oxidized version (shown below as structure IIIa) of structure III is also within the scope of the invention.

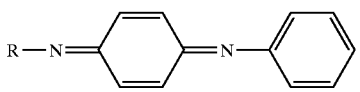

IIIa

Within structure III is structure IIIb below, N-2-pentyl-N'-phenyl-p-phenylene diamine, which may also be used.

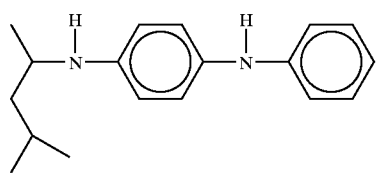

IIIb

This phenylene diamine is believed to be available from Uniroyal Chemical Co., under the tradename FLEXZONE 7L.

Other specific examples within structure III include N-phenyl-N'-(1,3-dimethylbutyl)-p-phenylenediamine; N-phenyl-N-isopropyl-p-phenylenediamine; N-phenyl-N'-(1-methylheptyl)-p-phenylenediamine; N-phenyl-N'-cyclohexyl-p-phenylenediamine; mixed diaryl-p-phenylenediamines; N,N'-diphenyl-p-phenylenediamine; N,N'-di-beta-naphthyl-p-phenylenediamine; N,N'-bis(1,4-dimethylpentyl)-p-phenylenediamine; N,N'-bis(1-ethyl-3-methylpentyl)-p-phenylenediamine; N,N'-bis(1-methylheptyl)-p-phenylenediamine; N-phenyl-N'-p-toluenesulfonyl-p-phenylenediamine; N-phenyl-N'-alkyl-p-phenylenediamines; dialkyl-p-phenylenediamines; N,N'-bis(1-cyclohexyl-1-ethyl)-p-phenylenediamine; N,N'-di(sec-hexyl)-p-phenylenediamine; N-(1,3-dimethylbutyl)-N'-(1,4-dimethylpentyl)-p-phenylenediamine; N-(sec-hexyl)-N+-(sec-alkyl)-p-phenylenediamines; N,N'-di(1,4-dimethylpentyl)-p-phenylenediamine; 2,4,6-tris(N-alkyl-p-phenylenediamino)-1,3,5-triazine; 6-ethoxy-1,2-dihydro-2,2,4-trimethylquinoline; and combinations thereof. See U.S. Pat. Nos. 5,252,737 (Stern); 4,297,269 (Merten); 5,126,385 (Wheeler); and 5,068,271 (Wheeler).

More specific materials within structure I further include those within structure IV

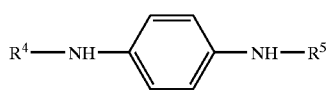

IV where $R^4$ and $R^5$ are $C_{5-12}$ alkyl, $C_{5-8}$ cycloalkyl, $C_{7-15}$ phenylalkyl, or $C_{6-10}$ aryl, with or without substitution by one or two $C_{1-4}$ groups.

In addition,

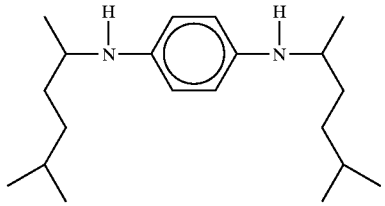

V

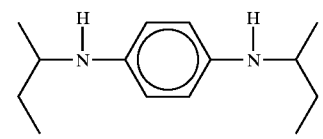

VI

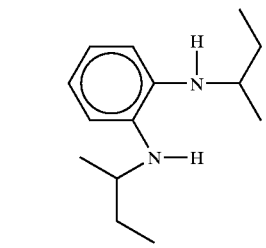

VII

Structure V (UNILINK 7100) is N,N'-bis-4-(5-methyl-2-butyl)-p-phenylene diamine, structure VI (UNILINK 4100) is N,N'-bis-4-(2-butyl)-p-phenylene diamine, and structure VII (UNILINK 4102) is N,N'-bis-4-(2-methylpropyl)-o-phenylene diamine.

Other commercially available phenylene diamine cure accelerators include those commercially from Plexysys under the tradename SANTOFLEX, such as SANTOFLEX 77PD and SANTOFLEX 715 PD, the latter of which being a mixture of

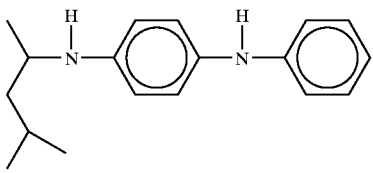

N-phenyl-N'-(1,3-dimethylbutyl)-p-phenylenediamine (CAS No. 793-24-8) (also called SANTOFLEX 6PPD and FLEXZONE 7),

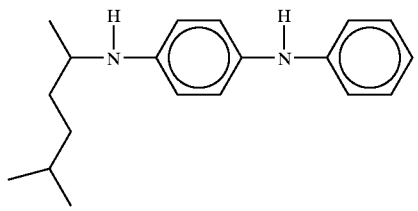

N-phenyl-N'-(1,4-dimethylpentyl)-p-phenylenediamine (CAS No. 3081-01-4), and

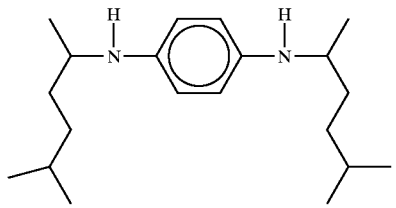

N,N'-bis (1,4-dimethylpentyl)-p-phenylene diamine (CAS No. 3081-14-9) (also called FLEXZONE 4L and SANTOFLEX 77PD).

The commercially available phenylene diamines may be obtained under one or more of the following tradenames: SUMILIZER from Sumitomo, such as BPA, BPA-M1, 4A, and 4M, and UOP from Crompton, such as UOP 12, UOP 5, UOP 788, UOP 288, UOP 88, UOP 26, UOP 388, UOP 588, UOP 36 and UOP 688.

Anaerobic compositions are based on a (meth)acrylate component, together with an anaerobic cure-inducing composition, such as one including the phenylene diamine cure accelerators useful in the present invention.

(Meth)acrylate monomers suitable for use as the (meth)acrylate component in the present invention may be chosen from a wide variety of materials, such as these represented by $H_2C=CGCO_2R^1$, where G may be hydrogen, halogen or alkyl groups having from 1 to about 4 carbon atoms, and $R^1$ may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, carbonate, amine, amide, sulfur, sulfonate, sulfone and the like.

Additional (meth)acrylate monomers suitable for use herein include polyfunctional (meth)acrylate monomers, such as di-or tri-functional (meth)acrylates like polyethylene glycol di(meth)acrylates, tetrahydrofuran (meth)acrylates and di(meth)acrylates, hydroxypropyl (meth)acrylate ("HPMA"), hexanediol di(meth)acrylate, trimethylol propane tri(meth)acrylate, diethylene glycol dimethacrylate, triethylene glycol dimethacrylate, tetraethylene glycol dimethacrylate, dipropylene glycol dimethacrylate, di-(pentamethylene glycol) dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate and bisphenol-A di(meth)acrylates, such as ethoxylated bisphenol-A (meth)acrylate ("EBIPMA").

Other (meth)acrylate monomers may also be used, such as reaction products of the diglycidylether of bisphenol-A with methacrylic acid and a (meth)acrylate ester corresponding to structure as shown below:

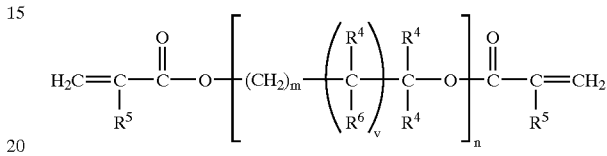

where $R^4$ may be selected from hydrogen, alkyl groups having from 1 to about 4 carbon atoms, hydroxyalkyl groups having from 1 to about 4 carbon atoms or

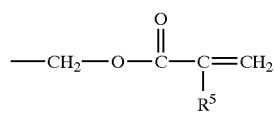

$R^5$ may be selected from hydrogen, halogen, and alkyl groups of from 1 to about 4 carbon atoms;

$R^6$ may be selected from hydrogen, hydroxy and

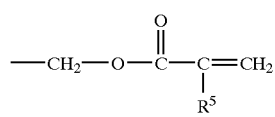

m is an integer equal to at least 1, from 1 to about 8 or higher, for instance, from 1 to about 4;

v is 0 or 1; and n is an integer equal to at least 1, 1 to about 20 or more.

Still other (meth)acrylate monomers that may be used herein include silicone (meth)acrylate moieties ("SiMA"), such as those taught by and claimed in U.S. Pat. No. 5,605,999 (Chu), the disclosure of which is hereby expressly incorporated herein by reference.

Of course, combinations of these (meth)acrylate monomers may also be used.

The (meth)acrylate component should comprise from about 10 to about 90 percent by weight of the composition, such as about 60 to about 90 percent by weight, based on the total weight of the composition.

The cure accelerators of the present invention should be used in an amount within the range of about 0.01 to about 5 percent by weight, such as about 0.01 to about 2 percent by weight, based on the total weight of the composition. When used in combination with conventional accelerators (though at lower levels, for such conventional accelerators), the inventive cure accelerators should be used in amounts of 0.0001 to 5 percent, such as 0.02 to 2 percent.

Recently, additional components have been included in traditional anaerobic adhesives to alter the physical properties of either the formulation or the reaction products thereof.

For instance, one or more of maleimide components, thermal resistance-conferring coreactants, diluent components reactive at elevated temperature conditions, mono- or poly-hydroxyalkanes, polymeric plasticizers, and chelators (see International Patent Application No. PCT/US98/13704, the disclosure of which is hereby expressly incorporated herein by reference) may be included to modify the physical property and/or cure profile of the formulation and/or the strength or temperature resistance of the cured adhesive.

When used, the maleimide, coreactant reactive diluent, polymeric plasticizer, and/or mono- or poly-hydroxyalkanes, may be present in an amount within the range of about 1 percent to about 30 percent by weight, based on the total weight of the composition. When used, chelators may ordinarily be present in the compositions in an amount from about 0.001 percent by weight to about 0.06 percent by weight, based on the total weight of the composition.

The inventive compositions may also include other conventional components, such as free radical initiators, free radical accelerators and co-accelerators, inhibitors of free radical generation, as well as metal catalysts, and plasticizers.

A number of well-known initiators of free radical polymerization are typically incorporated into the inventive compositions including, without limitation, hydroperoxides, such as cumene hydroperoxide ("CHP"), para-menthane hydroperoxide, t-butyl hydroperoxide ("TBH") and t-butyl perbenzoate. Other peroxides include benzoyl peroxide, dibenzoyl peroxide, 1,3-bis(t-butylperoxyisopropyl) benzene, diacetyl peroxide, butyl 4,4-bis(t-butylperoxy) valerate, p-chlorobenzoyl peroxide, cumene hydroperoxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane and combinations thereof.

Such peroxide compounds are typically employed in the present invention in the range of from about 0.1 to about 10 percent by weight, based on the total weight of the composition, with about 1 to about 5 percent by weight being desirable.

Conventional accelerators of free radical polymerization may also be used in conjunction with the phenylene diamine cure accelerators, though in amounts less than that used in the past. Such cure accelerators are typically of the hydrazine variety (e.g., APH), as disclosed in the '330 and '349 patents. One benefit of the present invention is that the phenylene diamine cure accelerators render the use of such accelerators optional in preparing anaerobic adhesive compositions.

Co-accelerators of free radical polymerization may also be used in the compositions of the present invention including, without limitation, organic amides and imides, such as benzoic sulfimide (also known as saccharin). [See U.S. Pat. Nos. 4,287,350 (Rich) and 4,321,349 (Rich).]

Stabilizers and inhibitors (such as phenols including hydroquinone and quinones) may also be employed to control and prevent premature peroxide decomposition and polymerization of the composition of the present invention, as well as chelating agents [such as the tetrasodium salt of ethylenediamine tetraacetic acid ("EDTA")] to trap trace amounts of metal contaminants therefrom.

Metal catalyst solutions or pre-mixes thereof are used in amounts of about 0.03 to about 0.1 percent by weight. Other agents such as thickeners, non-reactive plasticizers, fillers, and other well-known additives may be incorporated therein where the art-skilled believes it would be desirable to do so.

The present invention also provides methods of preparing and using the inventive anaerobic adhesive compositions, as well as reaction products of the compositions.

The compositions of the present invention may be prepared using conventional methods which are well known to those persons of skill in the art. For instance, the components of the inventive compositions may be mixed together in any convenient order consistent with the roles and functions the components are to perform in the compositions. Conventional mixing techniques using known apparatus may be employed.

The compositions of this invention may be applied to a variety of substrates to perform with the desired benefits and advantages described herein. For instance, appropriate substrates may be constructed from steel, brass, copper, aluminum, zinc, and other metals and alloys, ceramics and thermosets. The compositions of this invention demonstrate particularly good bond strength on steel, brass, copper and zinc. In addition, the compositions are particularly attractive as regards cure through volume, which ordinarily eludes conventional anaerobic adhesives.

As with other anaerobic adhesives, the compositions of the present invention are capable of curing in the substantial absence of air. However, unlike some anaerobic adhesive compositions, the compositions of this invention are capable of curing to form a reaction product at ambient environmental conditions, i.e., at room temperature, instead of requiring elevated temperatures. And while the so-formed reaction product forms an acceptable bond, that bond is capable of withstanding elevated temperature conditions by resisting thermal degradation.

In addition, this invention provides a method of preparing an anaerobic adhesive, the steps of which include mixing together a (meth)acrylate component and an anaerobic cure accelerator within structure I.

The invention also provides a process for preparing a reaction product from the anaerobic adhesive composition of the present invention, the steps of which include applying the composition to a desired substrate surface and exposing the composition to an anaerobic environment for a time sufficient to cure the composition.

This invention also provides a method of using as a cure accelerator for anaerobic adhesives compounds within structure I.

And the present invention provides a method of using an anaerobic curative within structure as a replacement for acetyl phenylhydrzine and/or toluidine(s) as cure accelerators for anaerobic adhesives.

In view of the above description of the present invention, it is clear that a wide range of practical opportunities is provided. The following examples are provided for illustrative purposes only, and are not to be construed so as to limit in any way the teaching herein.

EXAMPLES

Formulation of Anaerobic Adhesives

We prepared seven compositions, each of which included a (meth)acrylate component (comprising PEGMA), and other components as set forth below in Table 1 in percent by weight:

TABLE 1

| Component | | Sample No./Amt. (wt %) | | | | | | |
|---|---|---|---|---|---|---|---|---|
| Type | Identity | 1 | 2 | 3 | 4 | 5 | 6 | 7 |
| (Meth)acrylate | PEGMA | 75.1 | 74.8 | 76.7 | 76.7 | 74.7 | 74.7 | 74.7 |
| Plasticizer | FLEXOL | 19.8 | 19.7 | 19.8 | 19.8 | 20.0 | 20.0 | 20.0 |
| Phenylene Diamine Cure Accelerator | SANTOFLEX 715PD | 0 | 0 | 0.025 | 0 | 0 | 0.025 | 0.5 |
| | SANTOFLEX 77PD | 0 | 0 | 0 | 0.025 | 0 | 0 | 0 |
| Anaerobic Cure Inducing Composition | CHP | 1.3 | 1.3 | 1.3 | 1.3 | 1.3 | 1.3 | 1.3 |
| | APH | 0.20 | 0.20 | 0.20 | 0.20 | 0 | 0 | 0 |
| | DEPT | — | — | — | — | 0.5 | 0.5 | 0 |
| | Saccharin | 1.0 | 1.0 | 1.0 | 1.0 | 1.0 | 1.0 | 1.0 |
| | Naphtha-quinone* | 0.5 | 1.0 | 0 | 0 | 0.5 | 0 | 0.5 |
| | Chelator | 1 | 1 | 1 | 1 | 2 | 2 | 2 |

*5% solution in PEGMA.

Initially, the compositions were prepared by adding with mechanical mixing at room temperature the appropriate amounts of the components as noted.

The components were mixed for an appropriate period of time to allow for dissolution and/or dispersion, as the case may be, of the solid components. The so-formed formulations were stored for further use by covering the beaker ensuring that an air pocket remained between the surface of the formulation and the cover.

The formulations in accordance with this invention show shelf-stability at room temperature in open containers over time.

Application and Ambient Temperature Cure of Anaerobic Adhesives

The sample formulations prepared as described above were applied in duplicate to five sets of degreased ⅜×16 mild steel nut and bolt assemblies, which were then allowed to cure at room temperature for a period of time of about 24 hours. After the cure time, the fasteners were evaluated for break strength and prevail strength, data for which are shown below in Table 2.

TABLE 2

Break/Prevail (in-lb) on Degreased Steel Nuts/Bolts

| Room Temp. Cure (hrs) | Sample No. | | | | | | |
|---|---|---|---|---|---|---|---|
| | 1 | 2 | 3 | 4 | 5 | 6 | 7 |
| 0.25 | 47/1 | 45/2 | 82/16 | 70/8 | 40/1 | 60/5 | 85/21 |
| 0.5 | 81/1 | 66/1 | 109/37 | 87/21 | 33/2 | 66/5 | 108/18 |
| 1 | 103/14 | 98/15 | 120/46 | 106/33 | 56/1 | 88/21 | 124/39 |
| 2 | 135/52 | 120/38 | 135/57 | 117/46 | — | — | — |
| 4 | 136/79 | 131/65 | 137/54 | 122/39 | — | — | — |
| 16 | — | — | — | — | 173/87 | 165/79 | 150/73 |
| 21 | 155/78 | 164/70 | 142/42 | 146/61 | — | — | — |

Where napthaquinone is included in Sample No. 3, the anaerobic adhesive demonstrates an enhanced cure speed benefit from the phenylene diamine cure accelerator.

These data indicate that the compositions in accordance with this invention (i.e., Sample Nos. 3, 4, 6 and 7) functioned at room temperature like traditional anaerobic (meth)acrylate-based adhesives when applied and cured on the substrates. However, in comparison with certain examples of those traditional anaerobic (meth)acrylate-based adhesives (e.g., Sample Nos. 1, 2, or 5) which are set forth in Table 2 for comparative purposes, the inventive compositions showed enhanced cure speed, whether the phenylene diamine cure accelerator was used in combination with APH and/or DEPT, or without either of the traditional cure accelerators.

While the present invention has been described herein by way of illustration and examples, it will be clear to those persons of skill in the art that changes and modifications may be made from the specific description without departing from the spirit and scope of the present invention defined by claims which follow hereinafter.

What is claimed is:

1. An anaerobic adhesive composition, comprising:

(a) a (meth)acrylate component;

(b) an anaerobic cure-inducing composition; and (c) a phenylene diamine-based cure accelerator within structure I:

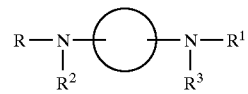

I wherein R and R$^1$ may be the same or different and may be selected from C$_{1-12}$ alkyl, C$_{1-12}$ alkenyl, C$_{5-12}$ cyclo or bicycloalkyl, C$_{6-18}$ aryl, and derivatives thereof, and is C$_{6-18}$ arylene, and derivatives thereof and oxidized versions thereof.

2. The composition according to claim 1, wherein the (meth)acrylate component is represented by H$_2$C=CGCO$_2$R$_1$, wherein G is a member selected from the group consisting of H, halogen and alkyl having from 1 to about four carbon atoms, and R$_1$ is a member selected from the group consisting of alkyl, cycloalkyl, aklenyl, cycloalkenyl, alkaryl, and aryl groups having from 1 to about 16 carbon atoms, with or without substitution or interruption by a member selected from the group consisting of silane, silicon, oxygen, halogen, carbonyl, hydroxyl, ester, carboxylic acid, urea, urethane, carbamate, amine, amide, sulfur, sulonate and sulfone.

3. The composition according to claim 1, wherein the (meth)acrylate component is a member selected from the group consisting of silicone (meth)acrylate moieties, polyethylene glycol di(meth)acrylates, bisphenol-A-(meth)acrylates, ethoxylated bisphenol-A-(meth)acrylates, tetrahydrofuran (meth)acrylates and di(meth)acrylates, hydroxypropyl (meth)acrylate, hexanediol di(meth)acrylate, trimethylol propane tri(meth)acrylate, and an acrylate ester corresponding to the structure shown below:

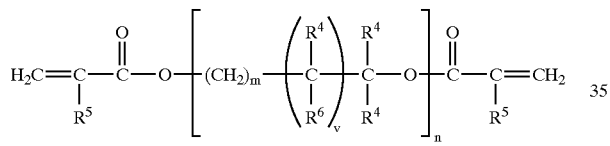

wherein R$^4$ may be selected from the group consisting of hydrogen, alkyl of 1 to about 4 carbon atoms, hydroxyalkyl of 1 to about 4 carbon atoms and

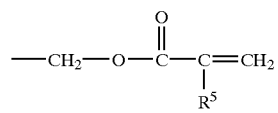

R$^5$ may selected from the group consisting of hydrogen, halogen, and alkyl of 1 to about 4 carbon atoms;

R$^6$ may be selected from the group consisting of hydrogen, hydroxy and

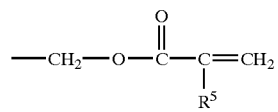

m is at least 1;
v is 0 or 1; and
n is at least 1;
and combinations thereof.

4. The composition according to claim 1, wherein the phenylene diamine cure accelerator is within structure II:

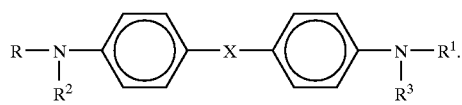

5. The composition according to claim 1, wherein the phenylene diamine cure accelerator is within structure III:

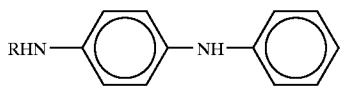

wherein R is as defined above.

6. The composition according to claim 1, wherein the phenylene diamine cure accelerator is within structure IIIa:

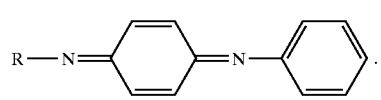

7. The composition according to claim 1, wherein the phenylene diamine cure accelerator is represented by a member selected from the group consisting of:

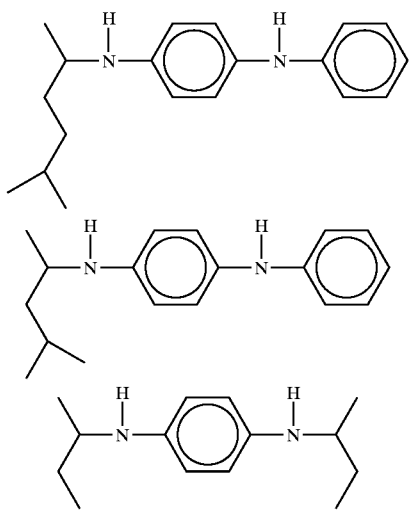

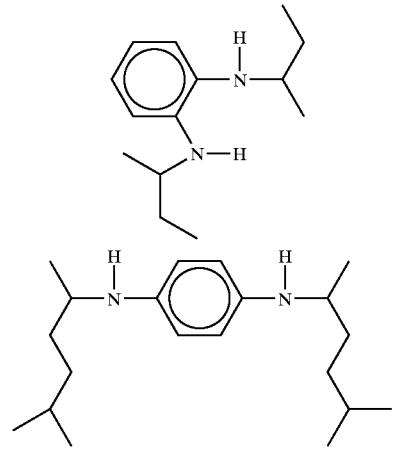

8. The composition according to claim 1, wherein the phenylene diamine cure accelerator is a member selected from the group consisting of N-phenyl-N'-(1,3-dimethylbutyl)-p-phenylenediamine; N-phenyl-N'-isopropyl-p-phenylenediamine; N-phenyl-N'-(1-methylheptyl)-p-phenylenediamine; N-phenyl-N'-cyclohexyl-p-phenylenediamine; mixed diaryl-p-phenylenediamines; N,N'-diphenyl-p-phenylenediamine; N,N'-di-beta-naphthyl-p-phenylenediamine; N,N'-bis(1,4-dimethylpentyl)-p-phenylenediamine; N,N'-bis(1-ethyl-3-methylpentyl)-p-phenylenediamine; N,N'-bis(1-methylheptyl)-p-phenylenediamine; N-phenyl-N'-p-toluenesulfonyl-p-phenylenediamine; N-phenyl-N'-alkyl-p-phenylenediamines; dialkyl-p-phenylenediamines; N,N'-bis(1-cyclohexyl-1-ethyl)-p-phenylenediamine; N,N'-di(sec-hexyl)-p-phenylenediamine; N-(1,3-dimethylbutyl)-N'-(1,4-dimethylpentyl)-p-phenylenediamine; N-(sec-hexyl)-N'-(sec-alkyl)-p-phenylenediamines; N,N'-di(1,4-dimethylpentyl)-p-phenylenediamine; 2,4,6-tris(N-alkyl-p-phenylenediamino)-1,3,5-triazine; 6-ethoxy-1,2-dihydro-2,2,4-trimethylquinoline; and combinations thereof.

9. Reaction products of the composition according to claim 1.

10. A method of using as a cure accelerator for anaerobic adhesive compounds within structure I:

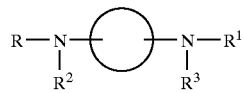

I where R and $R^1$ may be the same or different and may be selected from $C_{1-12}$ alkyl, $C_{1-12}$ alkenyl, $C_{5-12}$ cyclo or bicycloalkyl, $C_{6-18}$ aryl, and derivatives thereof, and

is $C_{6-18}$ arylene, and derivatives thereof, and oxidized versions thereof providing a (meth)acrylate component, providing an anaerobic cure-inducing composition, providing a cure accelerator of structure I, wherein compound of structure I accelerates cure of anaerobic adhesive compounds comprising methacrylate component.

11. A method of preparing an anaerobic adhesive composition, comprising the step of:
mixing together a (meth)acrylate component, an anaerobic cure inducing composition and an anaerobic cure accelerator within structure I:

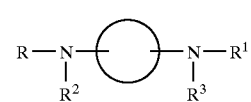

I wherein R and $R^1$ may be the same or different and may be selected from $C_{1-12}$ alkyl, $C_{1-12}$ alkenyl, $C_{5-12}$ cyclo or bicycloalkyl, $C_{6-18}$ aryl, and derivatives thereof, and

is $C_{6-18}$ arylene, and derivatives thereof, and oxidized versions thereof.

* * * * *